United States Patent [19]

Kardos et al.

[11] Patent Number: 5,339,441
[45] Date of Patent: Aug. 16, 1994

[54] POLARIZING DEVICE WITH OPTICALLY CONTACTED THIN FILM INTERFACE FOR HIGH POWER DENSITY ULTRAVIOLET LIGHT

[75] Inventors: Thomas A. Kardos, Nesconsett, N.Y.; Fred G. Kinley, Mission Viejo, Calif.

[73] Assignee: Advanced Intervention Systems, Inc., Irvine, Calif.

[21] Appl. No.: 907,893

[22] Filed: Jul. 2, 1992

[51] Int. Cl.$^5$ .................. G02B 5/30; G02B 27/28; G02B 1/10; G02B 5/04

[52] U.S. Cl. .................. 359/352; 359/359; 359/487; 359/583; 359/833

[58] Field of Search .............. 359/352, 359, 580, 583, 359/586, 588, 833, 350, 351, 487, 629, 638, 639, 640

[56] References Cited

U.S. PATENT DOCUMENTS

| | | | |
|---|---|---|---|
| 3,704,934 | 12/1972 | Holmes et al. | 359/583 |
| 4,406,520 | 9/1983 | Sato | 359/487 |
| 4,556,292 | 12/1985 | Mathyssek et al. | 359/487 |
| 4,733,926 | 3/1988 | Title | 359/352 |
| 4,966,438 | 10/1990 | Mouchart et al. | 359/586 |

OTHER PUBLICATIONS

Baumeister, et al. "Use of Hafnium Dioxide in Multilayer Dielectric Reflectors for the Near UV", *Applied Optics*, vol. 16, No. 2, Feb. 1977.

*Primary Examiner*—Loha Ben
*Assistant Examiner*—John Juba, Jr.
*Attorney, Agent, or Firm*—Flehr, Hohbach, Test, Albritton & Herbert

[57] ABSTRACT

In an ultraviolet polarizing device, a first piece of glass having a mating surface, a second piece of glass having a mating surface for mating with the mating surface of the first piece, a multilayer optical thin film coating disposed between the mating surface of the first and second pieces of glass, said mating surfaces and said thin film coating forming a physical bond therebetween without the use of a cement to thereby permit the polarizing device to be capable of withstanding high power laser energy.

26 Claims, 1 Drawing Sheet

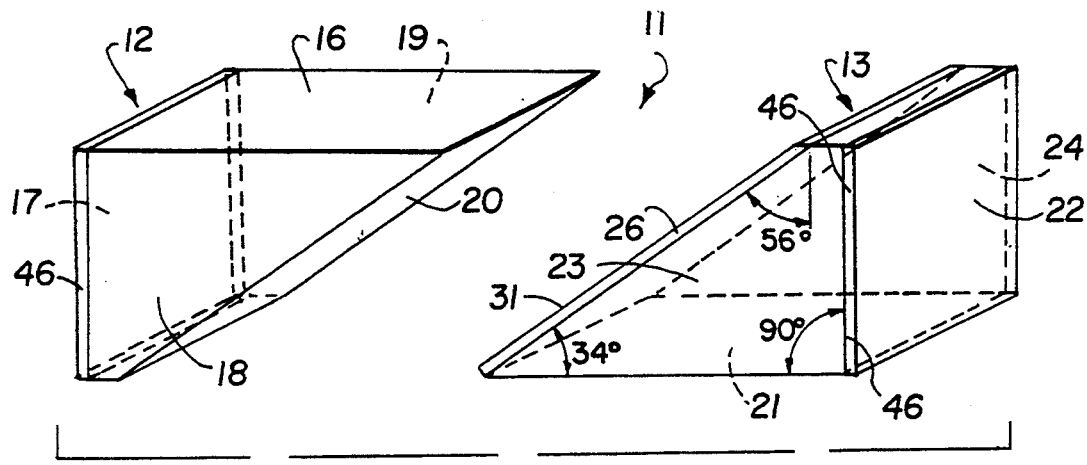
*Fig.1*
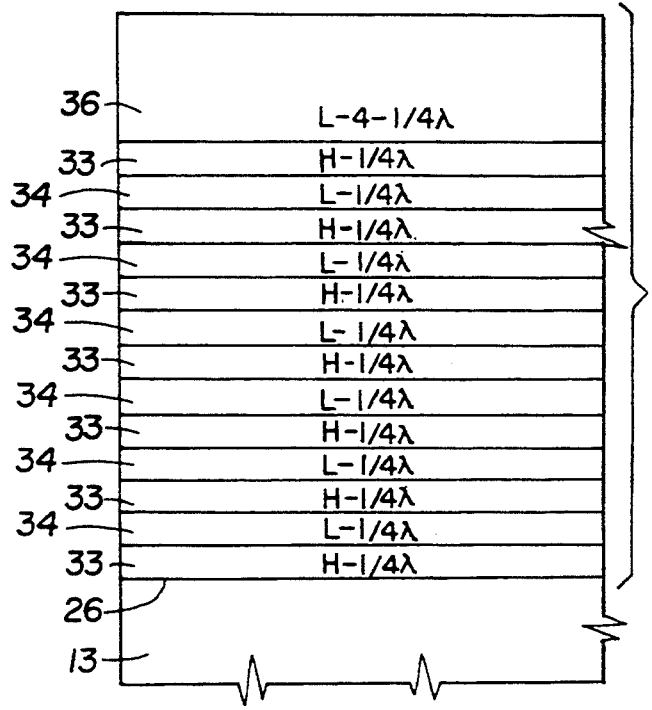
*Fig.2*
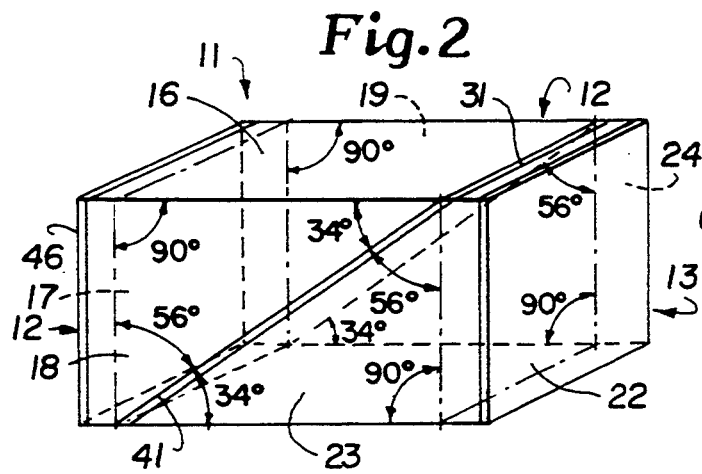
*Fig.3*
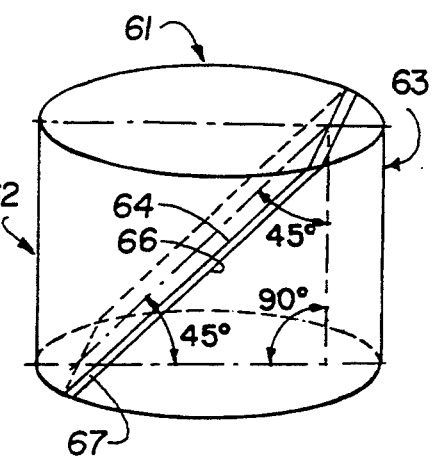
*Fig.4*
*Fig.5*

POLARIZING DEVICE WITH OPTICALLY CONTACTED THIN FILM INTERFACE FOR HIGH POWER DENSITY ULTRAVIOLET LIGHT

This invention relates to an optical device with an optically contacted thin film interface or more particularly to a polarizing device with an optically contacted thin film interface for high power density ultraviolet light.

Polarizing devices for ultraviolet light have heretofore been provided however they have a number of deficiencies particularly when utilized with high power ultraviolet light. Intervening fluids or cements have been utilized in such devices with limited efficiency in the ultraviolet. Also because of absorption losses the intervening fluids or cements were degraded which in time may be sufficient to cause separation of the two bulk material parts forming part of the device. There is therefore a need for a new and improved polarizing device which overcomes these disadvantages.

In general it is an object of the present invention to provide an optical device with an optically contacted thin film interface.

Another object of the present invention to provide an optical device of the above character which is used as a polarizer and which is capable of being used with high power ultraviolet light.

Another object of the invention is to provide polarizing device of the above character which is monolithic.

Another object of the invention is to provide a polarizing device of the above character which has high efficiency.

Another object of the invention is to provide a polarizing device the above character which is not limited by linear displacement errors associated with intervening fluids or cements.

Another object of the invention is to provide a polarizing device of the above character which is particularly suitable for the 308 nanometer ultraviolet laser light generated by excimer lasers.

Another object of the invention is to provide a polarizing device of the above character which can withstand high average powers without failure.

Another object of the invention is to provide a polarizing device of the above character having surfaces which are optically contacted.

Another object of the invention is to provide a polarizing device of the above character in which the thin film can be optically contacted with very little force.

Another object of the invention is to provide a polarizing device and method of the above character which is monolithic after optical contact is made.

Additional objects and features of the present invention will appear from the following description in which the preferred embodiment is set forth in detail in conjunction with the accompanying drawings.

FIG. 1 is an isometric view of two prisms which are utilized with a thin film coating on one of the surfaces to provide an optical device incorporating the present application.

FIG. 2 is a greatly enlarged cross sectional view of the thin film coating shown on the prism in FIG. 1.

FIG. 3 is an isometric view of a polarizing device having a rectangular conformation incorporating the present invention made from the two prisms shown in FIG. 1 and utilizing the thin film coating shown in FIG. 2 and which are optically contacted to provide a monolith.

FIG. 4 is an isometric view of an optical device having a circular configuration utilizing the same construction used in the rectangular embodiment shown in FIG. 3.

FIG. 5 is an isometric view similar to FIG. 4 in which right angle prisms are used rather than Littrow prisms.

In general, the ultraviolet polarizing device is comprised of a first piece of glass having a mating surface and a second piece of glass having a mating surface for mating with the mating surface of the first piece. A multilayer thin film optical coating is disposed between the mating surfaces of the first and second pieces of glass. The mating surfaces and the thin film optical coating form a physical bond between the first and second pieces.

More in particular, the optical device 11 of the present invention consists of first and second pieces 12 and 13 of a low index glass of high quality such as a bulk material of fused silica. As shown in FIG. 1, the pieces 12 and 13 are in the form of Littrow prisms 12 and 13. Prism 12 is provided with a top surface 16 and an end surface 17 which extend at right angles to each other and side surfaces 18 and 19 extending at right angles to the end surface 17 and a surface 20 forming a hypotenuse at Brewsters angle extending generally between the top surface 16 and the end surface 17. Similarly, the prism 13 is provided with a bottom surface 21 and an end surface 22 extending at right angles to each other and side surface walls and side walls 23 and 24 extending at right angles to the end surface 22 and surface 26 forming a hypotenuse at Brewsters angle extending generally from the bottom surface 21 to the end surface 22. The walls 20 and 26 serve as mating surfaces for the polarizing device 11 shown in FIG. 3. These surfaces 20 and 26 are polished so they are very flat, in other words, have a sufficient flatness so when they are brought together as hereinafter described an optical contact is formed in the form of a physical connection provided by the force of atomic interaction between those two surfaces to form the two prisms 12 and 13 into a monolithic device as shown in FIG. 3. In order to make this possible, the flatness or minimum smoothness of the surfaces 20 and 26 should be in the range of $\lambda/10$ to $\lambda/20$. Thus, the Littrow prism of the present invention can be characterized as one having a polished surface extending at a polarizing angle which, in the present case, is the hypotenuse extending at Brewster's angle.

A multilayer thin film optical coating 31 is provided which serves as interface between the two mating surfaces 20 and 26 and is provided on one or both of the surfaces 20 and 26. Typically, the coating is placed on one of the surfaces, however, it should be appreciated that if desired the multilayer thin optical film coating can be split so that one portion of the same can be provided on one surface 20 and the remaining portion of the coating can be provided on the other surface 26. However, since there is no distinct advantage to dividing the multilayer coating on the two surfaces, it is generally preferable to provide the coating 31 on one of the surfaces to simplify the manufacture of the coating.

Thus, let it be assumed that it is desired to form the thin film optical coating 31 on the surface 26 of the prism 13. As shown in FIG. 2, the coating 31 is comprised of alternating layers 33 of high index material whereas the other layers 34 are formed of a low index material. The layers 33 and 34 all have an optical thickness which is ¼ of the design wavelength. By way of example, the design wavelength can be 308 nanometers in the ultraviolet which is the ultraviolet wavelength of excimer lasers. This ¼ is normalized for an angle of incidence of 56°. The high index material should have an index of refraction ranging from 1.8 to 2.3. Materials having an index of refraction within this range and useful in connection with the present invention are hafnium oxide (2.05), scandium oxide (1.95), titanium pentoxide (2.3), yttrium oxide (1.85). The low index material should have an index of refraction from 1.38 to 1.75. Materials having an index of refraction within this range and useful in the present invention are magnesium fluoride (1.38), silicon dioxide (1.51), aluminum oxide (1.75), thorium fluoride (1.52), and aluminum fluoride (1.35). The materials are all dielectrics.

All the materials should have the capability of being evaporated in a vacuum chamber as for example by the use of electron beam evaporation. The material also should be transparent to ultraviolet and particularly in a 308 nanometer range. The coating 31 is provided with a plurality of periods in which each period is comprised of a high index layer and a low index layer 34. A suitable number of periods can be provided for example as shown in FIG. 2, six of such periods have been provided to form a six period stack for the coating 31 which is followed by a single ¼ wave layer 33 of high index material followed by an overcoat layer 36 formed of a low index material and having an optical thickness of four ¼ waves or one wavelength of the design wavelength. Thus, the equation for the stack forming the coating 31 is as follows:

$$(HL)^6 H L^4$$

In connection with the present invention, silicon dioxide and hafnium oxide were selected for the low and high index materials, respectively. They are transparent to ultraviolet and they are resistant to high energy laser power, particularly ultraviolet at 308 nanometers. The material is also compatible with the design of a polarizing device and the desired angle of incidence. In addition, materials are clean and can be used in a vacuum chamber. Additional periods in addition to six can be provided to achieve a slightly greater extinction ratio TP/TS where TP is transmitted P polarization and TS is transmitted S polarization. However, the ultraviolet increase in efficiency can decrease rapidly with the number of periods added due to scatter and absorption.

After the surface 26 has been coated, the prisms 12 and 13 are taken into a clean area with at least a Class 100 flow bench. Both the surfaces 20 and 26 are then cleaned so that they are free of dust, oil and any other contamination. The two prisms 12 and 13 are then aligned so that the surfaces 20 and 26 are in precise alignment with each other. The two very coplanar surfaces 20 and 26 are then brought together with minimal force applied to the prisms 12 and 13 until they make the physical contact. When the surfaces 20 and 26 are carefully prepared so that they are coplanar, substantially no force is required to bring the two surfaces 20 and 26 together after they have been made to physically touch each other. The thin film optical coating 31 has a physical thickness of 0.9 to 1.1 microns and does not interfere with this mating of the two surfaces 20 and 26. When such two surfaces are brought together they are physically connected by the force of atomic interaction between the two surfaces to form the two prisms 12 and 13 into a single monolith or device 11 as shown in FIG. 3. In the monolith the overcoat 36 does not have an optical effect because it is a full wave. The H layer 33 on the end of the stack 31 and H layer 36 on the other of the stack 31 have indices of refraction which match that of the glass pieces 12 and 13 so that no optical mismatch occurs at the surfaces 20 and 26. As soon as the two prisms 12 and 13 have been optically contacted, a bead 41 of an optical cement of a suitable type such as U/V curing cement Norland 61 or equivalent may then be placed around the polarizing device 11 interface between the two prisms 12 and 13 to further reduce the possibility of any water absorption into the thin film coating 31.

In order to further enhance the capabilities of the optical device, the entrance and exit surfaces 17 and 22 forming the sides of the attenuator 11 can be coated with a conventional antireflection coating as for example one formed of magnesium fluoride having an portably optical thickness of ¼ the design wavelength. Such antireflection coating 46 is shown in FIG. 1 on the surfaces 17 and 22. Such antireflection coatings are formed in a conventional manner such as by evaporating materials utilized in antireflection coatings in a vacuum chamber.

The optical device of the present invention can be used in a number of different applications. For example, it can be used as a polarizing attenuator as disclosed in copending application Serial No. 07/909,054 filed Jul. 2, 1992, in connection with an excimer laser used in laser angioplasty procedures for varying the laser power applied in that procedure. Also, the optical device can be utilized as a polarizer to enable highly efficient separation of the orthogonal components of linear polarized light near the selected design wavelengths at high power levels without damage. This is made possible because cements and intervening fluids are not utilized in the interface between the prisms 12 and 13. The angular deviation and linear displacement of the transmittal light through the optically contacted device can be held to within typical single element optical component deviations resulting from standard optical fabrication techniques. Since the optical device is a monolithic unit upon optical contacting it is not limited by linear displacement errors typically introduced into the interface region of common polarizers due to the finite thickness of intervening fluid or cement required for their construction. The optical device of the present invention can be designed for any wavelength of interest by selecting appropriate substrate and thin film material combinations.

As is well know to those skilled in the art of optical polarizers, they have applications in a number of areas as for example, attenuating transmitted linearly polarized light, polarization, beam splitting, polarization sensing, polarization coupling, etc. All such tasks can be accomplished at high power levels with high efficiency at the designed wavelength. It has become particularly effective at the design wavelength of 308 nanometers ultraviolet for excimer laser (XeCl) laser light.

The design of the polarizing attenuator of the present invention can be designed to operate at any desired wavelength region for which optical elements are commonly fabricated merely by selection of the appropriate materials and the design of the coating and the prism angle. The prism angle is 56°±½° in this case.

In accordance with the present invention, the two prisms 12 and 13 are manufactured at a specific prism angle such as 56°±¼° so as to allow the "p" component to be highly transmitted. The "s" component which is created by the thin film optical coating is reflected off at some angle such 34°±¼° to achieve the polarization effects required.

The entrance and exit for the polarizing device and the antireflection coatings 46 thereon reduce the overall Fresnel loses to less than 0.25% per surface at the design wavelength. The overall wave front deformations the laser beam is held to a minimum because of the contact between the mating faces of the prisms 12 and 13. Since the laser beam does not pass through any optical cement since the overall absorption of the optical thin film coating 31 as well as that of the glass (i.e. fused silica) used for the prisms 12 and 13 is very low, the polarizing device can handle very high laser energies without degradation of the capabilities of the device.

By way of example, a beam splitter at the 308 nanometer design wavelength had a transmission exceeding 97% of the transmitted "p" state while achieving a reflection greater than 95% of the reflective "s" state. The "s" reflection can be theoretically increased without sacrificing transmitted "p" state to greater than 99.5% such that the overall efficiency is greater than 200:1.

Another embodiment of the invention is shown in FIG. 4 in which an optical device 51 is provided also in the form of a monolith similar to the optical device 11 which rather than being a parallelepiped as in FIG. 3 is in the form of a cylinder. It is formed of two pieces of glass 52 and 53 of the same type as pieces. 12 and 13. The two pieces 52 and 53 are formed of Littrow prisms as hereinbefore described with the same Brewsters angles as shown. The pieces 52 and 53 are provided with mating surfaces 54 and 56 with a thin film coating 57 therebetween to form a physical bond of the type hereinbefore described to provide the monolith.

Still another embodiment of the invention is shown in FIG. 5 in which the optical device 61 also is in the form of a cylindrical monolith and is comprised of pieces of glass 62 and 63 and also are formed of the same material as pieces 12 and 13. They are provided with mating surfaces 64 and 66 which are provided with a thin film coating 67 therebetween of the type hereinbefore described to provide a physical bond to form the monolith. The pieces 62 and 63 differ from the pieces 52 and 53 shown in FIG. 4 in that they are in the form of right angle prisms rather than the Littrow prisms. Thus, the angles are at 45° for the acute angles rather than 56° and 34°. The 45° prisms are desirable in certain applications in which the user desires that the reflected polarization be at 45° rather than at 34° with Littrow prisms.

In view of the foregoing, it can be seen that there has been provided a device which permits efficient polarization-selective control of high power light sources. The device overcomes the traditional limitations of polarizing devices by limiting the use of inefficient materials in the optical region for cementing or index matching. As hereinbefore explained, this is accomplished by directly mounting bulk materials to high efficiency dielectric film coatings by optical contact.

What is claimed is:

1. In an optical device for use at a design wavelength of approximately 308 nanometers, a first piece of glass having a first mating surface, a second piece of glass having a second mating surface for mating with the mating surface of the first piece of glass, said first and second mating surface having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or intervening fluid.

2. In an optical device for use at a design wavelength of approximately 308 nanometers, a first piece of glass having a mating surface, a second piece of glass having a mating surface for mating with the mating surface of the first piece of glass, said mating surfaces having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or intervening fluid, said pieces of glass being in the form of Littrow prisms.

3. A device as in claim 1 wherein said pieces of glass are in the form of a 45° degree prisms.

4. A device as in claim 1 wherein said glass and said thin film coating are transparent at the design wavelength.

5. A device as in claim 1, wherein said glass is fused silica.

6. A device as in claim 1, wherein said thin film optical coating is comprised of dielectric materials.

7. A device as in claim 1 wherein said monolith is a parallelepiped.

8. A device as in claim 1 wherein said monolith is a cylinder.

9. In an optical device for use at a laser design wavelength of approximately 308 nanometers, a first piece of glass having a first mating surface, a second piece of glass having a second mating surface for mating with the mating surface of the first piece of glass, said first and second mating surfaces having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or an intervening fluid to thereby permit the optical device to withstand laser energy passing therethrough.

10. In an optical device for use at a design wavelength of approximately 308 nanometers a first piece of glass having a mating surface, a second piece of glass having a mating surface for mating with the mating surface of the first piece of glass, said mating surfaces having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or an intervening fluid to thereby permit the optical device to withstand laser energy passing therethrough, said pieces of glass being in the form of Littrow prisms.

11. A device as in claim 9 wherein said pieces of glass are in the form of 45° degree prisms.

12. A device as in claim 9 wherein said glass and said thin film coating are transparent at the design wavelength.

13. A device as in claim 9 wherein said thin film coating is comprised of a plurality of periods, each of said periods consisting of a layer of high refractive index material having an optical thickness of ¼ of the design wavelength and a layer of low refractive index material having an optical thickness of ¼ of the design wavelength.

14. A device as in claim 13, wherein at least six periods are provided.

15. A device as in claim 13 wherein said high refractive index material has an index of refraction ranging from 2.05 to 2.15 and wherein said low refractive index material has an index of refraction ranging from 1.3 to 1.75.

16. A device as in claim 15 wherein said high refractive index material is hafnium oxide and wherein said low refractive index material is silicon dioxide.

17. In an optical device for use at a design wavelength of approximately 308 nanometers, a first piece of glass having a mating surface, a second piece of glass having a mating surface for mating with the mating surface of the first piece of glass, said mating surfaces having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or an intervening fluid to thereby permit the optical device to withstand laser energy passing therethrough, said first and second pieces of glass being in the form of Littrow prisms having hypotenuses which serve as mating surfaces.

18. In an optical device for use at a design wavelength, a first piece of glass having a mating surface, a second piece of glass having a mating surface for mating with the mating surface of the first piece of glass, said mating surfaces having a minimum surface smoothness of $\lambda/10$ to $\lambda/20$ and a multilayer thin film optical coating disposed between the mating surfaces of the first and second pieces of glass, said mating surfaces and said thin film coating forming a physical bond therebetween to provide a monolith without the use of a cement or an intervening fluid to thereby permit the optical device to withstand laser energy passing therethrough, the design wavelength being 308 nanometers.

19. A device as in claim 17 wherein said monolith has entrance and exit surfaces together with an antireflection coating disposed on the entrance and exits surfaces.

20. A device as in claim 19 wherein at the design wavelength, the P-polarization state of incident light is transmitted with high efficiency at an angle with respect to the optical axis through the entrance surface.

21. In an ultraviolet polarizing attenuator, a first Littrow prism of low refractive index material having first and second surfaces extending at right angles to each other and a mating surface extending between the first and second surfaces forming a hypotenuse, a second Littrow prism of low refractive index material having first and second surfaces extending at right angles to each other and a mating surface extending between the first and second surfaces and forming a hypotenuse, said mating surfaces having a minimum surface smoothness of $\lambda/10$ to $\lambda/20$ and a multilayer thin film optical coating formed of low and high refractive index dielectric materials having a design wavelength of 308 nanometers disposed between the mating surfaces of the first and second prisms, said mating surfaces and said thin film optical coating forming a physical bond therebetween without the use of a cement or an intervening fluid.

22. An attenuator as in claim 21 wherein said thin film optical coating is an optical stack comprised of a plurality of periods, each period consisting of a layer of high refractive index material having an optical thickness of ¼ of the design wavelength and a layer of low refractive index material having an optical thickness of ¼ of the design wavelength.

23. An attenuator as in claim 22 wherein said stack includes an additional ¼ wavelength layer of high refractive index material so that there is provided a layer of high refractive index material on each end of the stack to provide matching layers to match the low indices of the material of first and second prisms.

24. An attenuator as in claim 23 wherein said thin film optical coating includes an overcoat disposed over the additional one quarter wavelength layer of high refractive index material.

25. An attenuator as in claim 24 wherein said overcoat is comprised of layer of a low refractive index material having a thickness of approximately one wavelength at the design wavelength.

26. An attenuator as in claim 22 in which the thin film optical coating has the stack $(HL)^6HL^4$.

* * * * *